June 5, 1934.  S. J. ROTH  1,961,643
HEATER DEVICE
Filed Nov. 10, 1932
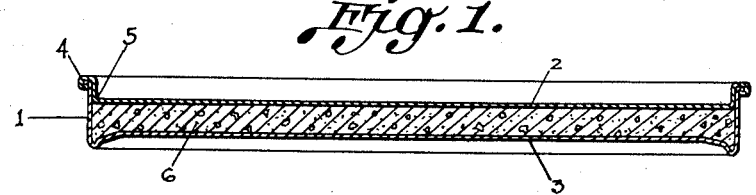
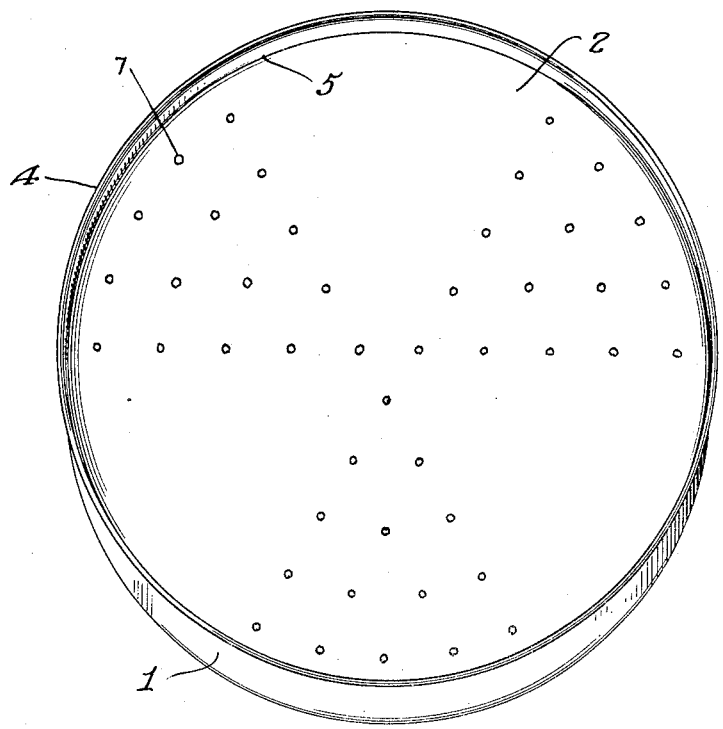
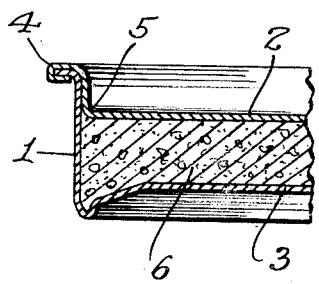
INVENTOR
SOL. J. ROTH
BY Samuel Ostrolenk
ATTORNEY Patented June 5, 1934

1,961,643

UNITED STATES PATENT OFFICE 1,961,643

HEATER DEVICE

Sol J. Roth, New York, N. Y.

Application November 10, 1932, Serial No. 641,953

1 Claim. (Cl. 126—221)

My invention relates to novel apparatus for and methods of heat transmission for cooking and the like, and more particularly, to novel methods of cooking.

In transmitting heat, as for use in cooking, it is often essential that the heat supplied be evenly distributed and at a controlled temperature or at a controlled rate. The construction of the ordinary hot plate or cooking utensil does not accomplish this because the distribution of the heat conducting and heat holding materials are not of a type as to permit such a proper functioning. This results in scorched foods, ruined pans, burnt toast et cetera.

Accordingly, an object of my invention is to provide novel apparatus for and novel methods of applying a uniform and predetermined temperature in heating and cooking.

A further object of my invention is to provide a novel cooking plate which permits heating at a uniform and predetermined temperature.

There are other objects of my invention which, together with the foregoing will appear in the detailed description which is to follow, in connection with the drawing.

Figure 1 is a cross section of a preferred form of my invention and Figure 2 is a perspective view of my invention. Fig. 3 is an enlarged sectional view of Fig. 1 showing the detail of the crimp attaching the upper and lower flanges.

In Figure 1, I have shown a disk-shaped member 1 comprising a top plate 2 and a bottom plate 3. The edges of plate 3 are turned up as at 4 and seamed to plate 2 as shown at 5.

The members 2 and 3 may be made of any good heat transmitting material which has the necessary mechanical strength for a cooking plate, such as sheet iron, iron plate, copper sheet, et cetera.

In the space between members 2 and 3, there is a filling of material 6 which acts as a heat diffuser and heat storer. Gravel, silica, sand, cement, soapstone, crushed lava and other siliceous material may be used. This material is packed into the available space substantially filling it.

The top plate 2 is perforated as shown at 7 to permit the escape of any gas and vapors formed in the space 6 when the member 1 is heated.

When in use, the device is placed over a source of heat with top plate 2 upwards, upon which is placed an article to be heated, such as a utensil.

The theory of operation is as follows: The lower member 3 is heated from a source of heat underneath it. Being a good conductor of heat, it transfers the heat to the granular siliceous material 6 above it. This material absorbs the heat and diffuses it through all the granules. Being surrounded, this mass 6 cannot give up its heat to the air by convection and it therefore heats the upper plate 2 by radiation and conduction. The upper plate 2 serves as a source of evenly distributed heat of an even temperature. The holes 7 therein, provided when thin material is used for the casing, act to allow passage of vapor and gases thus preventing buckling by the expansion and contraction of the vapor and gases. The lip 8 is to prevent liquid overflowing from above from extinguishing the flame.

The temperature of the top plate 2 may be controlled by adjusting the rate of heating of the bottom plate 3.

When used in conjunction with cooking, many advantages are evident. The feature of heat storage is especially important where it is desired to use a simmering heat. This property acts to supply heat continuously and yet without danger of local overheating to utensils. Hence, meals keep warm for a long time after the gas has been turned off. Should liquids run over, they are caught and prevented from extinguishing the gas flame. The necessity of stirring foods to prevent burning and sticking to the bottom of the pan is avoided. When used in a toaster, the device prevents the burning of the toast.

The device 1 can also be used as a bed warmer or heat pad.

Another method of use is to cook the food over an open flame to bring it up to temperature, in the meantime heating the device 1 to absorb heat, and then placing the utensil containing the food over the device 1 which is heated with a small flame for the continuance of the cooking operation.

Although for purposes of illustrating my invention, I have shown one form thereof, it will be obvious that it may take other forms and I do not intend to limit myself except as set forth in the appended claim.

I claim:

In combination a hot plate comprising an imperforated metallic bottom plate; a perforated metallic top plate secured at its peripheral edge to said bottom plate and spaced therefrom to form, with said bottom plate, a chamber; a granular siliceous filling contained in said space between said plates, said bottom plate conducting heat applied thereto to said siliceous filling for storing heat therein, said siliceous material conducting the heat stored therein to the top plate for radiating the stored heat, said metallic plate being so formed to provide a lip about the periphery to the top plate and extending above the plane of the top plate.

SOL J. ROTH.